(12) United States Patent
Wright

(10) Patent No.: US 9,448,354 B1
(45) Date of Patent: Sep. 20, 2016

(54) GLASS-BASED LIGHT EMITTING PANEL

(71) Applicant: Timothy Glen Wright, Peachtree City, GA (US)

(72) Inventor: Timothy Glen Wright, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 144 days.

(21) Appl. No.: 14/199,684

(22) Filed: Mar. 6, 2014

Related U.S. Application Data

(60) Provisional application No. 61/774,251, filed on Mar. 7, 2013.

(51) Int. Cl.
*F21V 7/04* (2006.01)
*F21V 8/00* (2006.01)

(52) U.S. Cl.
CPC .................................. *G02B 6/0065* (2013.01)

(58) Field of Classification Search
CPC ....................................................... G02B 6/0065
USPC ........................................................... 362/606
See application file for complete search history.

(56) References Cited

U.S. PATENT DOCUMENTS

2012/0147477 A1* 6/2012 Chen .................. B29D 11/0073
359/642

FOREIGN PATENT DOCUMENTS

TW        M405579 U1 *  6/2011  ............... G02B 3/00

OTHER PUBLICATIONS

Cooper Lighting by Eaton, Encounter and Skyridge Series; Recessed LED Luminaires; Feb. 2014.

* cited by examiner

*Primary Examiner* — Anh Mai
*Assistant Examiner* — Hana Featherly
(74) *Attorney, Agent, or Firm* — King & Spalding LLP

(57) ABSTRACT

A glass-based light emitting panel (LEP) includes a glass layer that has a light receiving edge. The glass-based LEP also includes a silicone layer attached to the glass layer. The silicone layer includes an optic control pattern. The glass-based LEP is designed to receive light through the light receiving edge of the glass. The glass-based LEP is also designed to emit a portion of the light through the silicone layer.

12 Claims, 5 Drawing Sheets

US 9,448,354 B1

GLASS-BASED LIGHT EMITTING PANEL

RELATED APPLICATION

The present application claims priority under 35 U.S.C. §119(e) to U.S. Provisional Patent Application No. 61/774,251, titled "Glass-Based Light Emitting Panel," and filed on Mar. 7, 2013, the entire content of which is hereby incorporated herein by reference.

TECHNICAL FIELD

The present disclosure relates generally to a light emitting panel (LEP), in particular to a glass-based LEP panel that includes a silicone layer.

BACKGROUND

A light emitting panel (LEP) (also known as a light guide) is typically used in edge-lit light fixtures. LEPs are commonly manufactured from optically clear plastics. For example, an LEP may be made from a polycarbonate or an acrylic material, such as Polymethyl methacrylate (PMMA). In edge-lit applications, a light source that is positioned adjacent to a narrow side of an LEP emits light towards the narrow side of the LEP. Light that enters the LEP through the narrow side of the LEP is emitted through one or both of the broad sides of the LEP. In some cases, a broad side of the LEP may include an optic control pattern carved or molded into the optically clear plastic material (e.g., an acrylic material) to reflect light back within the LEP and/or refract light that exits through the particular broad side.

In some example embodiments, an LEP made from a material other than optically clear plastics may provide improved optic efficiency, improved tolerance to temperature changes, and higher overall durability compared to an LEP made from, for example, an acrylic material.

SUMMARY

The present disclosure relates to a glass-based LEP panel that includes a silicone layer. In some example embodiments, a glass-based light emitting panel (LEP) includes a glass layer that has a light receiving edge. The glass-based LEP also includes a silicone layer attached to the glass layer. The silicone layer includes an optic control pattern. The glass-based LEP is designed to receive light through the light receiving edge of the glass. The glass-based LEP also designed to emit a portion of the light through the silicone layer.

In another example embodiment, a light fixture includes a glass-based light emitting panel (LEP) and a light source. The glass-based LEP includes a glass layer that has a light receiving edge. The glass-based LEP also includes a silicone layer coupled to the glass layer. The silicone layer includes an optic control pattern. The light source is positioned adjacent to the light receiving edge of the glass layer to emit light toward the light receiving edge of the glass layer. The glass-based LEP is designed to emit at least a portion of the light through the silicone layer.

In yet another example embodiment, a method of producing a glass-based light emitting panel (LEP) includes placing liquid silicone on a glass layer. The glass layer includes an optically clear piece of glass. The glass layer also includes a light receiving edge and a broad surface. The method further includes forming an optic control pattern in the liquid silicone placed on the glass layer. The method also includes curing the liquid silicone placed on the glass layer after the optic control pattern is formed in the liquid silicone.

These and other aspects, objects, features, and embodiments will be apparent from the following description and the claims.

BRIEF DESCRIPTION OF THE DRAWINGS

Reference will now be made to the accompanying figures, which are not necessarily to scale, and wherein.

Figure 1:
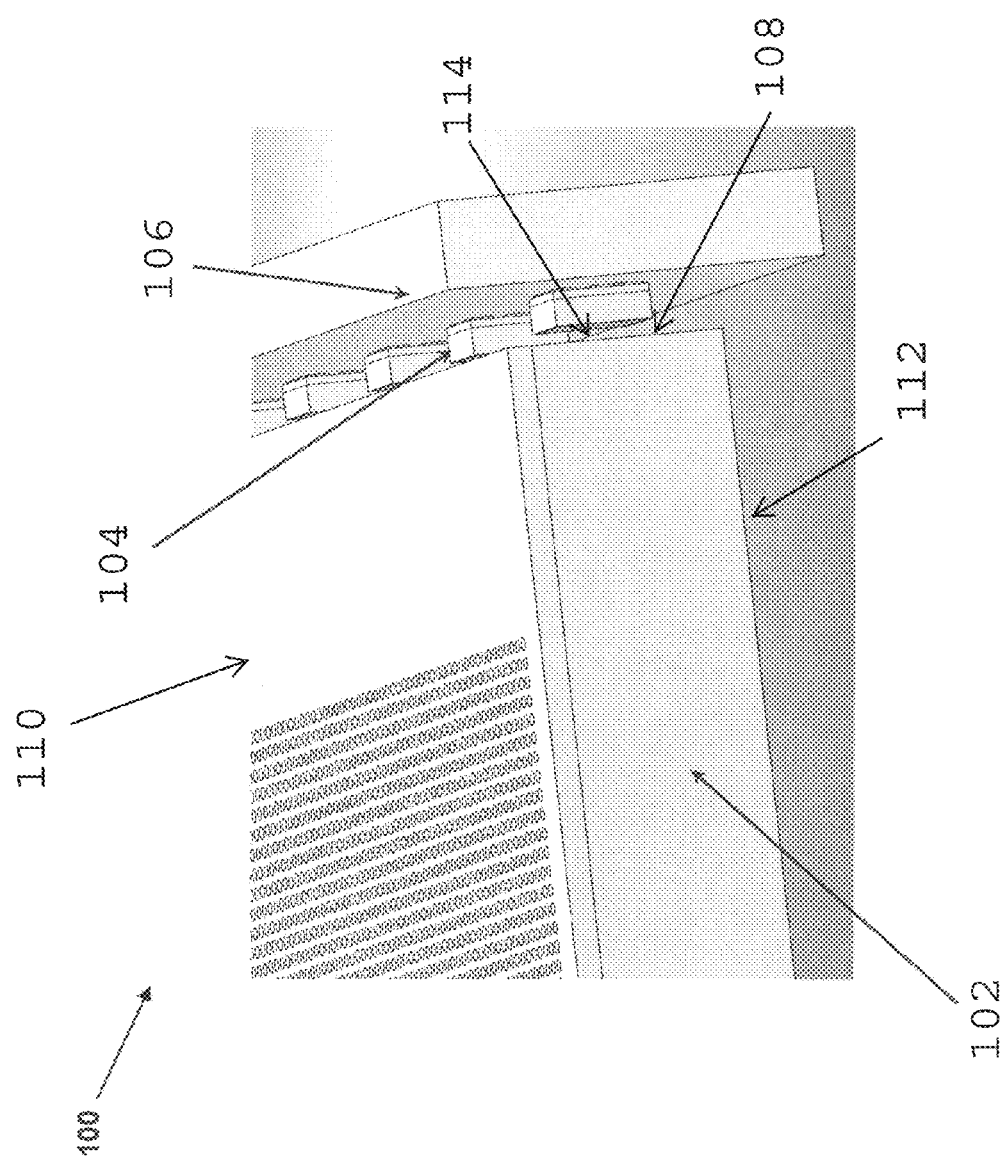
FIG. 1 illustrates a partial view of a light fixture including a glass-based light emitting panel (LEP) according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, reference numerals designate like or corresponding, but not necessarily identical, elements.

DETAILED DESCRIPTION OF THE EXAMPLE EMBODIMENTS

In the following paragraphs, example embodiments will be described in further detail by way of example with reference to the figures. In the description, well known components, methods, and/or processing techniques are omitted or briefly described. Furthermore, reference to various feature(s) of the example embodiments is not to suggest that all embodiments must include the referenced feature(s).

Turning now to the figures, example embodiments are described. FIG. 1 a partial view of a light fixture 100 including a glass-based light emitting panel (LEP) 102 according to an example embodiment. The lighting fixture 100 includes the glass-based LEP 102 and light sources 104. The glass-based LEP 102 includes a light receiving side 108 and broad surfaces 110, 112. The broad surface 110 includes an optical control pattern that is designed to provide a desired distribution of the light emitted by the lighting fixture 100.

As illustrated in FIG. 1, the light sources 104 are positioned adjacent to the light receiving side 108 of the glass-based LEP 102. In some example embodiments, the lighting fixture 100 may include a gap 114 between the light sources 104 and the light receiving side 108 of the glass-based LEP 102. For example, the gap 114 may provide spacing to accommodate changes in the size of the glass-based LEP 102, for example, due to changes in temperature.

In some example embodiments, the light sources 104 may be attached to a circuit board 106, such as an LED circuit board, that includes electrical circuitry to provide power to the light sources 104. In some example embodiments, a driver (not shown) may provide power to the light sources 104. For example, the driver may provide power to the light sources 104 by converting Alternating-Current (AC) power to Direct-Current (DC) power and providing the DC power to the light sources 104. In some example embodiments, the light sources 104 may be light emitting diodes (LEDs). To illustrate, the light sources 104 may be discrete LEDs, organic light-emitting diodes (OLEDs), LED chip on board, or an array of discrete LEDs. Alternatively, the light sources 104 may also be light sources other than LEDs.

As illustrated in FIG. 1, the light sources 104 may face the light receiving side 108 of the glass-based LEP 102. To illustrate, the light sources 104 may emit light toward the light receiving side 108 of the glass-based LEP 102. The light from the light sources 104 may enter the glass-based LEP 102 through the light receiving side 108 of the glass-based LEP 102. At least a portion of the light that enters the glass-based LEP 102 may be emitted through one or both of the broad surfaces 110, 112 of the glass-based LEP 102.

Figure 2:
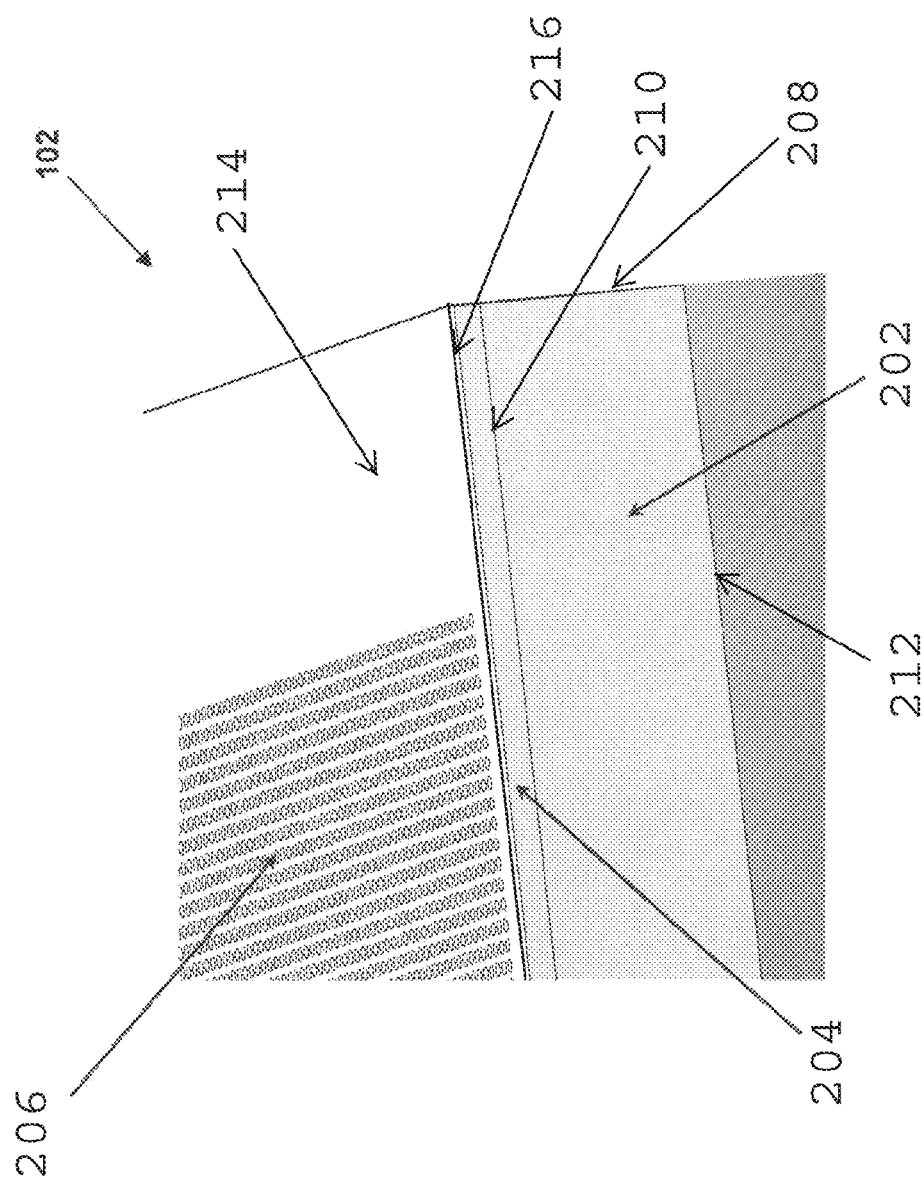
FIG. 2 illustrates a partial view of the glass-based LEP of FIG. 1 according to an example embodiment.

FIG. 2 illustrates a partial view of the glass-based LEP 102 of FIG. 1 according to an example embodiment. The glass-based LEP 102 includes a glass layer 202 and a silicone layer 204. The glass-based LEP 102 is designed to receive light (for example, light from the light sources 104 of FIG. 1) through the glass layer 202 and to emit at least a portion of the light through the silicone layer 204. In some example embodiments, the glass layer 202 is an optically clear piece of glass, and the silicone layer 204 is an optically clear silicone. As shown in FIG. 2, the glass layer 202 includes a light receiving edge 208, a broad surface 210, and another broad surface 212. For example, the light receiving edge 208 may be positioned on the light receiving side 108 of the glass-based LEP 102 illustrated in FIG. 1. To illustrate, the light receiving edge 208 of the glass layer 202 may be positioned adjacent to the light sources 104 shown in FIG. 1. As illustrated in FIG. 1, the broad surfaces 210, 212 of the glass layer 202 are on opposite sides of the glass layer 202.

The glass layer 202 is designed to receive a light (e.g., light from the light sources 104 shown in FIG. 1) through the light receiving edge 208 of the glass layer 202. After the light from the light sources enters the glass layer 202 through the light receiving edge 208, the glass layer 202 may emit a portion of the light through one or both broad surfaces 210, 212 of the glass layer 202. In general, the thickness of the glass layer 202 may vary depending on various factors, such as the dimensions of the light sources (e.g., the light sources 104 of FIG. 1) and the number of light sources that emit light toward the light receiving edge of the glass layer 202. The glass layer 202 may also have different thicknesses in different edge-lit lighting fixtures. For example, different lighting fixtures that are used for different purposes may have different thicknesses of the glass layer 202 of the glass-based LEP 102.

As illustrated in FIG. 2, the silicone layer 204 is attached to the glass layer 202 of the glass-based LEP 102. For example, the silicone layer 204 may be attached to the broad surface 210 of the glass layer 202 as shown in FIG. 2. Because the silicone layer 204 is attached to the broad surface 210 of the glass layer 202, at least a portion of a light is emitted through the broad surface 210 of the glass layer 202 is emitted out of the glass-based LEP through the silicone layer 204.

In some example embodiments, the silicone layer 204 may be directly attached to the broad surface 210 of the glass layer 202 without any additional material, such as an adhesive material, between the glass layer 202 and the silicone layer 204. Alternatively, another material (e.g., an optic grade adhesive material) may be used between the silicone layer 204 and the glass layer 202. For example, use of an optic grade adhesive may provide a more secure attachment of the glass layer 202 and the silicone layer 204 to each other.

In some example embodiments, the silicone layer 204 includes an optic control pattern 206. The optical control pattern 206 may be designed to provide a particular distribution of the light emitted by a lighting fixture that includes the glass-based LEP 102, such as the lighting fixture 100 of FIG. 1. As illustrated in FIG. 2, the optic control pattern 206 of the silicone layer 204 is formed on a side 214 of the silicone layer 204 that faces away from the glass layer 202. In some example embodiments, the optic control pattern 206 may be formed into the silicone layer 204 on the side 214 of the silicone layer 204. Alternatively, the optic control pattern 206 may protrude out from the silicone layer 204 away from the glass layer 202.

In some example embodiments, a portion of the light emitted through the broad surface 210 of the glass layer 202 toward the silicone layer 204 is refracted by the silicone layer 204 as the light passes through the silicone layer 204. For example, the optic control pattern 206 may refract a portion of the light that passes through the silicone layer 204 resulting in a particular distribution of light emitted by the glass-based LEP 102. In some example embodiments, the optic control pattern 206 may reflect some of the light that reaches the optic control pattern 206 through the glass layer 202 back into the glass layer 202. At least a portion of the light that is reflected back into the glass layer 202 by the silicone layer 204 may be emitted by the LEP 102 through the broad surface 212 of the glass layer 202. As illustrated in FIG. 2, in some example embodiments, a silicone layer may not be attached to the broad surface 212 of the glass layer 202. However, in some alternative embodiments, a silicone layer may be attached to the broad surface 212 of the glass layer 202 as described below.

In some example embodiments, a protective glass sheet 216 may optionally be positioned over the silicone layer 204. The protective glass sheet 216 is designed to protect the glass-based LEP 102 from dirt, dust, and water.

The silicone layer 204 may be formed in one of several ways. For example, the silicone layer 204 may be molded over the glass layer 202. The silicone layer 204 may also be coated over the glass layer 202. In an alternative embodiment, the silicone layer 204 may be applied after the glass layer 202 is primed with a different material, such as an adhesive material, that may facilitate strong coupling of the silicone layer 204 to the glass layer 202.

In some example embodiments, the silicone layer 204 may be formed by pouring liquid silicone onto the glass layer 202 and curing the liquid silicone after the optic control pattern 206 is formed on the liquid silicone. For example, before curing the liquid silicone, the optic control pattern 206 may be formed on the liquid silicone by impressing the optic control pattern 206. The liquid silicone may be cured, for example, using ultraviolet light.

By using the optic control pattern 206 in the silicone layer 204, the glass-based LEP 102 can provide substantially the same optic control as an LEP made from an optically clear plastic (e.g., an acrylic material). Further, by using glass instead of, for example, an acrylic material, the glass-based LEP 102 may be used in light fixtures that operate at over 50 Volts. For example, the glass-based LEP 102 may be used in light fixtures that meet UL Class 1 or non Class 2 standard. Further, because glass and silicone have similar thermal expansion characteristics that closely match the thermal expansion characteristics of aluminum, the responses of silicone, glass, and aluminum to changes in temperature closely match. Thus, differences in temperature induced size changes between the glass-based LEP 102 and an aluminum lighting fixture frame are smaller than differences in temperature induced size changes between an acrylic-based LEP and an aluminum light fixture frame. In addition, because glass and silicone have greater temperature tolerance than an acrylic material, light sources (e.g., some LEDs) that exceed the upper temperature threshold of acrylic-based LEPs may be used with the glass-based LEP 102.

Although FIG. 2 illustrates the glass layer 202 as a flat layer, in alternative embodiments, the glass layer 202 may be rounded, cylindrical, curved, or may have other shapes without departing from the scope of this disclosure.

Figure 3:
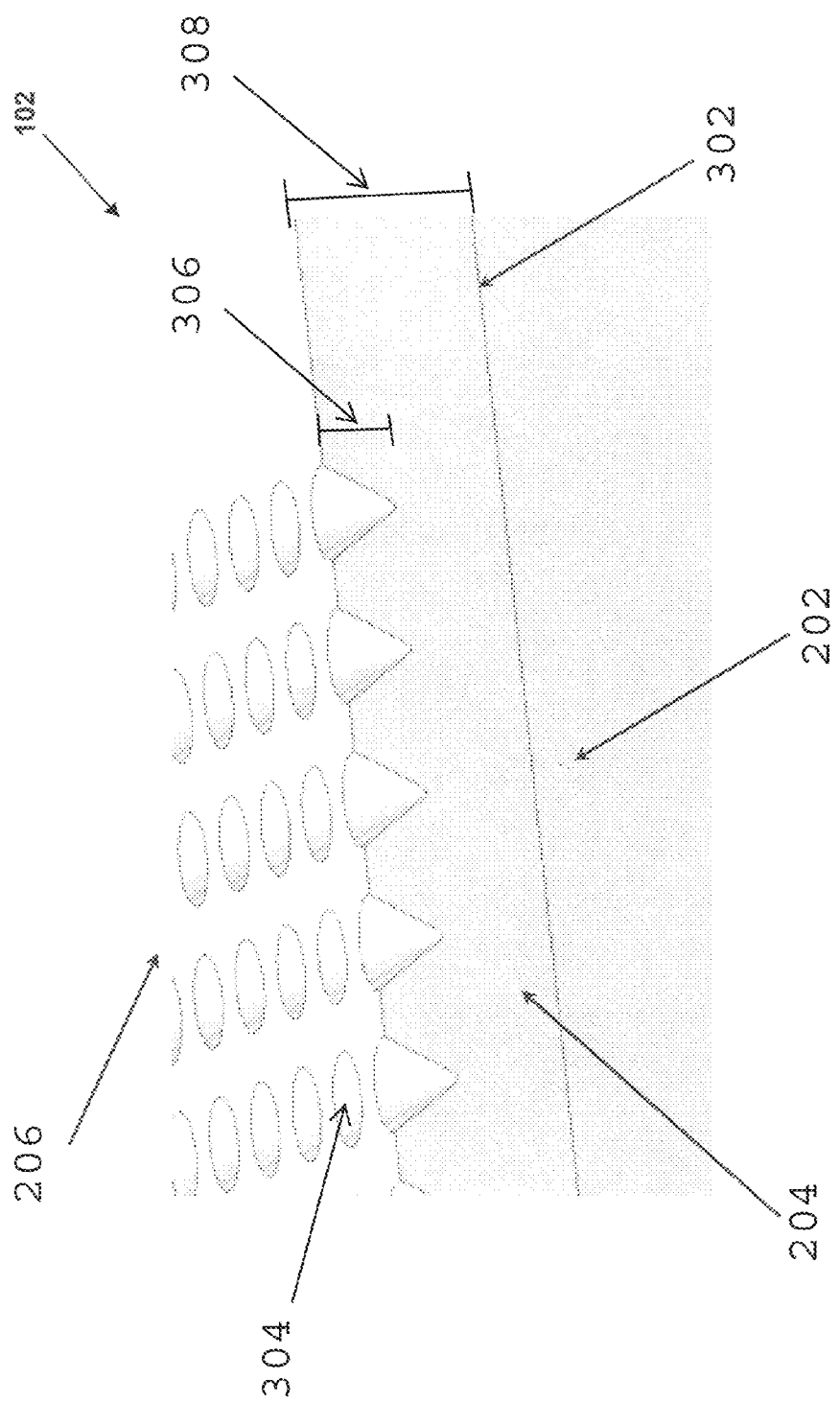
FIG. 3 is a close-up view of a cross-section of the glass-based LEP of FIG. 2 according to an example embodiment.

FIG. 3 is a close-up view of a cross-section of the glass-based LEP 102 of FIG. 2 according to an example embodiment. The glass layer 202 and the silicone layer 204 are coupled at the glass-silicone interface 302. As illustrated in FIG. 3, the optic control pattern 206 is formed into the silicone layer 204. For example, the optic control pattern 206 may include rows of depressions 304 that are formed into the silicone layer 204. To illustrate, the depressions 304 may be substantially cone-shaped as shown in FIG. 3. Alternatively, the depressions 304 may have other shapes without departing from the scope of this disclosure.

The shape of the each depression 304 may affect the distribution of light emitted by the glass-based LEP 102. In some example embodiments, the depth 306 of each depression 304 may also affect the distribution of the light emitted by the glass-based LEP 102 through optic control pattern 206 of the silicone layer 204 and through the broad surface 212 (shown in FIG. 2) of the glass layer 202.

As described above, a portion of the light that enters the glass-based LEP 102 through the light receiving edge 208 (shown in FIG. 2) of the glass layer 202 may be emitted through the silicone layer 204. The portion of the light that is emitted through the silicone layer 204 may be emitted through the optic control pattern 206. Some portion of the light that enters the glass layer 202 is emitted through the broad surface 212 of the glass layer 202. For example, a portion of the light that enters the glass-based LEP 102 through the light receiving edge 208 of the glass layer 202 may be reflected back into the glass layer 202 by the optic control pattern 206 and may be emitted through the broad surface 212 of the glass layer 202. As the light passes through the silicone layer 204, the shape of each depression 304 and the depth 306 of each depression 304 may affect refraction and reflection of light by the silicone layer 204, which in turn affects the distribution of the light emitted by the glass-based LEP 102. In some example embodiments, the depth 306 of the depressions 304 may be limited by the thickness 308 of the silicon layer 204. The depth 306 of the depressions 304 and the thickness 308 of the silicone layer 204 may affect refraction and reflection of light by the silicone layer 204. In some example embodiments, the thickness 308 of the silicone layer 204 is less than the thickness of the glass layer 202.

Although the optic control pattern 206 is shown in FIG. 3 to include cone-shaped depressions, in alternative embodiments, the optic control pattern 206 may depressions that have other shapes. In alternative embodiments, the optic control pattern 206 may include protrusions extending out from the silicone layer 204. Further, although the depressions 304 are arranged in rows in FIG. 3, in alternative embodiments, the depressions 304 may be arranged in a different configuration. For example, in some alternative embodiments, the optic control pattern 206 may be a different pattern from the particular pattern illustrated in FIG. 3

Figure 4:
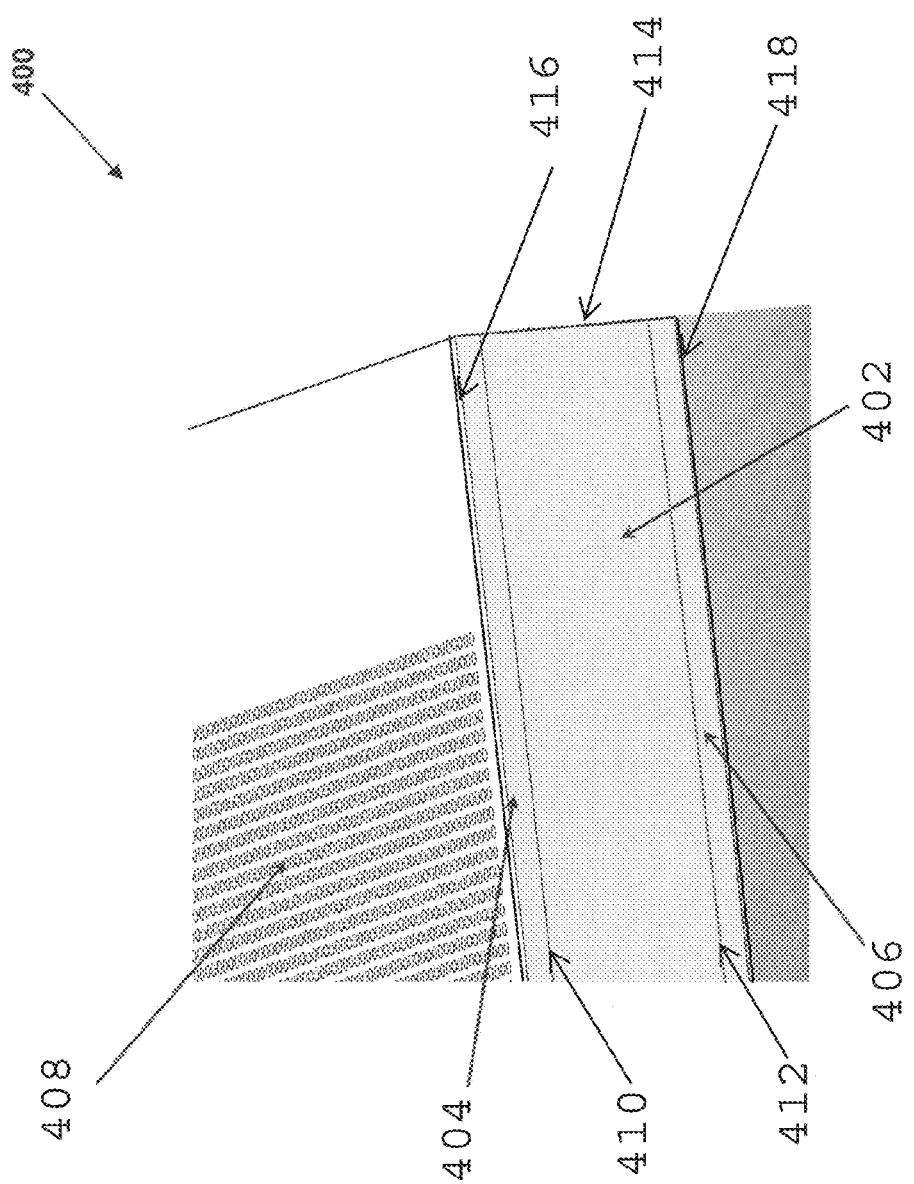
FIG. 4 illustrates a partial view of a glass-based LEP according to another example embodiment.

FIG. 4 illustrates a partial view of a glass-based LEP 400 according to an example embodiment. The LEP 400 includes a glass layer 402, a top silicone layer 404, and a bottom silicone layer 406. The top silicone layer 404 includes an optic control pattern 408. The bottom silicone layer 406 also includes an optic control pattern (shown in FIG. 5) that may be the same or a similar pattern as the optic control pattern 408. In some example embodiments, the optic control pattern formed in the bottom silicone layer 406 may be substantially different from the optic control pattern 408 of the top silicone layer 404.

The glass layer 402 includes a light receiving edge 414. The glass layer 402 also includes broad surfaces 410, 412. In some example embodiments, a portion of the light that enters the glass layer 402 through the light receiving edge 414 of the glass-based LEP 400 may be emitted through the top silicone layer 404 and the bottom silicone layer 406. To illustrate, the top silicone layer 404 is coupled to the broad surface 410 of the glass layer 402, and the bottom silicone layer 406 is coupled to the broad surface 412 of the glass layer 402. A portion of the light that enters the glass layer 402 through the light receiving edge 414 of the glass-based LEP 400 may be emitted out of the glass layer 402 through the broad surface 410. Similarly, another portion of the light that enters the glass layer 402 through the light receiving edge 414 of the glass-based LEP 400 may be emitted out of the glass layer 402 through the broad surface 412.

Some portion of the light that enters the glass layer 402 and reaches the top silicone layer 404 through the broad surface 410 of the glass layer 402 may be reflected back into the glass layer 402 by the silicone layer 404. A portion of the light that enters the glass layer 402 and reaches the top silicone layer 404 through the broad surface 410 of the glass layer 402 is emitted by the glass-based LEP 400 through the top silicone layer 404.

Similarly, a portion of the light that enters the glass layer 402 and reaches the bottom silicone layer 406 through the broad surface 412 of the glass layer 402 may be reflected back into the glass layer 402 by the bottom silicone layer 406. A portion of the light that enters the glass layer 402 and reaches the bottom silicone layer 406 through the broad surface 412 of the glass layer 402 is emitted by the glass-based LEP 400 through the bottom silicone layer 406. The portion of the light that is emitted by the glass-based LEP 400 through the top silicone layer 404 may be refracted by the optic control pattern 408 as the light passes through the top silicone layer 404. Similarly, the light that is emitted by the glass-based LEP 400 through the bottom silicone layer 406 may be refracted by the optic control pattern in the bottom silicone layer 406 as the light passes through the bottom silicone layer 406.

In some example embodiments, a protective glass sheet 416 may optionally be positioned over the top silicone layer 404. Similarly, a protective glass sheet 418 may optionally be positioned over the bottom silicone layer 406. The protective glass sheet 416, 418 are designed to protect the glass-based LEP 400 from dirt, dust, and water.

In some example embodiments, the top silicone layer 404 and the bottom silicone layer 406 may be attached to or formed on the glass layer 402 in a manner described with respect to the silicone layer 204 of FIG. 2. To illustrate, the top silicone layer 404 and the bottom silicone layer 406 may be molded over the glass layer 402. The top silicone layer 404 and the bottom silicone layer 406 may also be coated over the glass layer 402. In an alternative embodiment, the top silicone layer 404 and the bottom silicone layer 406 may be applied after the glass layer 402 is primed with a different material, such as an adhesive material, that may facilitate strong coupling of the top silicone layer 404 and the bottom silicone layer 406 to the glass layer 402.

In some example embodiments, the top silicone layer 404 and the bottom silicone layer 406 may be formed one at a time by pouring liquid silicone onto one of the broad surfaces 410, 412 of the glass layer 402 and curing the liquid silicone after the respective optic control pattern is formed on the liquid silicone. For example, before curing the liquid silicone, the respective optic control pattern may be formed on the liquid silicone by impressing the particular optic control pattern. The liquid silicone may be cured using ultraviolet light.

In some example embodiments, the glass layer 402 corresponds to the glass layer 202 of FIG. 2. Similarly, in some example embodiments, the top silicone layer 404 and the bottom silicone layer 406 substantially correspond to the silicone layer 204 of FIG. 2. For example, in some example embodiments, the glass-based LEP 400 corresponds to the glass-based LEP 102 with a second silicone layer attached to the broad surface 212 of the glass layer 202 of the glass-based LEP 102 of FIG. 2.

By using the optic control pattern 408 in the top silicone layer 404 and the optic control pattern (shown in FIG. 5) in the bottom silicone layer 406, the glass-based LEP 400 can provide substantially the same optic control as an LEP made from an optically clear plastic (e.g., an acrylic material). Further, by using glass instead of, for example, an acrylic material, the glass-based LEP 400 may be used in light fixtures that operate at over 50 Volts. For example, the glass-based LEP 400 may be used in light fixtures that meet UL Class 1 or non-Class 2 standard. Further, because glass and silicone have similar thermal expansion characteristics that closely match the thermal expansion characteristics of aluminum, the responses of silicone, glass, and aluminum to changes in temperature closely match. Thus, differences in temperature induced size changes between the glass-based LEP 400 and an aluminum lighting fixture frame are smaller than differences in temperature induced size changes between an acrylic-based LEP and an aluminum light fixture frame. In addition, because glass and silicone have greater temperature tolerance than an acrylic material, light sources (e.g., some LEDs) that exceed the upper temperature threshold of acrylic-based LEPs may be used with the glass-based LEP 400.

Figure 5:
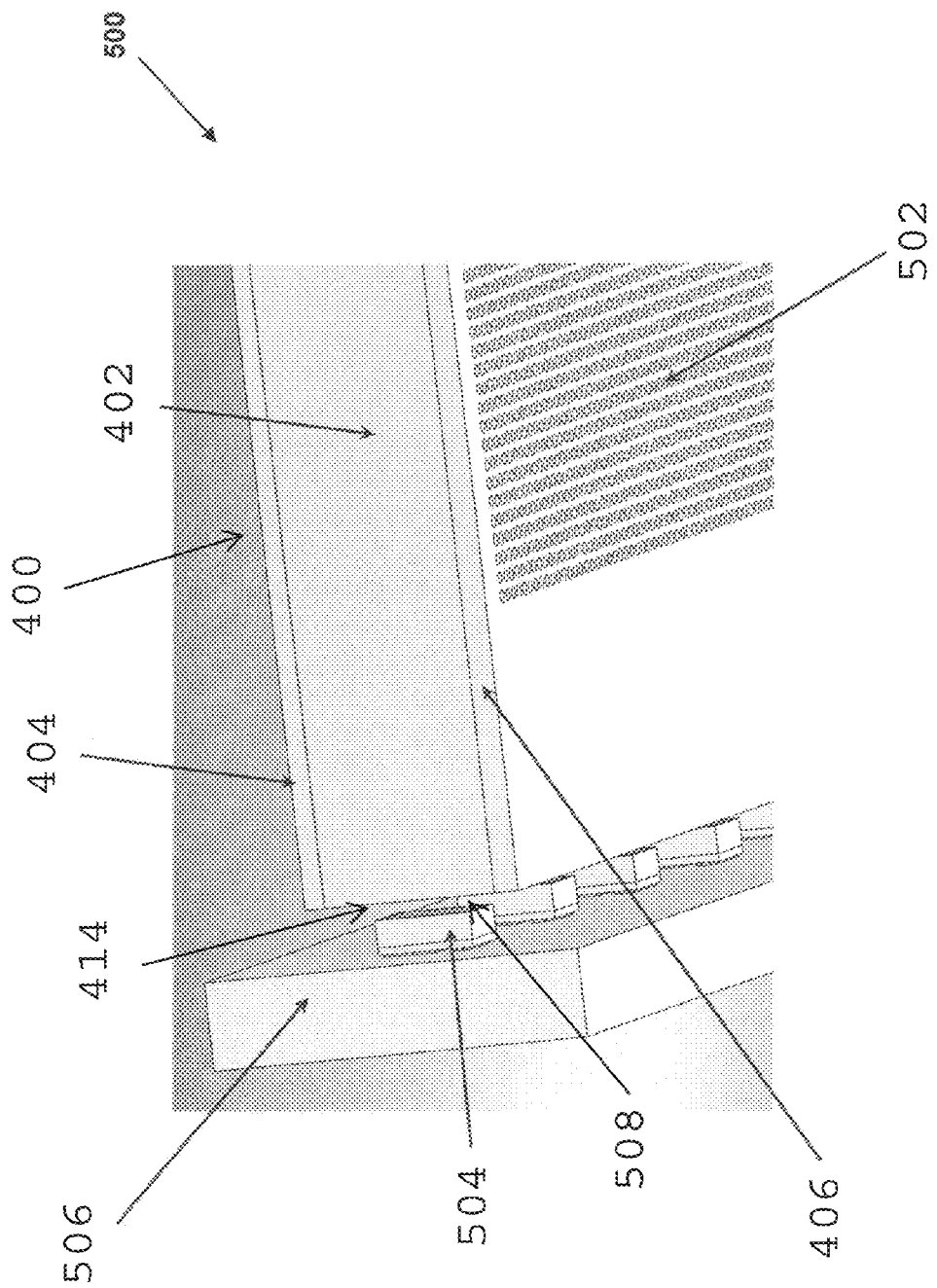
FIG. 5 illustrates a partial view of a light fixture including the glass-based LEP of FIG. 4 according to an example embodiment.

FIG. 5 illustrates a partial view of a light fixture 500 including a glass-based LEP 400 of FIG. 4 according to an example embodiment. The lighting fixture 500 includes the glass-based LEP 400 and light sources 504. In some example embodiments, the light sources 504 may be attached to a circuit board 506, such as an LED circuit board, that includes electrical circuitry to provide power to the light sources 504. In some example embodiments, a driver (not shown) may provide power to the light sources 504. For example, the driver may provide power to the light sources 504 by converting Alternating-Current (AC) power to Direct-Current (DC) power and providing the DC power to the light sources 504.

In some example embodiments, the light sources 504 may be light emitting diodes (LEDs). To illustrate, the light sources 504 may be discrete LEDs, organic light-emitting diodes (OLEDs), LED chip on board, or an array of discrete LEDs. Alternatively, the light sources 504 may also be light sources other than LEDs.

As illustrated in FIG. 5, the light sources 504 are positioned adjacent to the light receiving edge 414 of the glass layer 402 of the glass-based LEP 400. For example, the light sources 504 may face the light receiving edge 414 of the glass layer 402. To illustrate, the light sources 504 may emit light toward the light receiving edge 414 of the glass layer 402. The light from the light sources 504 may enter the glass-based LEP 400 through the light receiving edge 414 of the glass layer 402 of the glass-based LEP 400. At least a portion of the light that enters the glass-based LEP 400 through the light receiving edge 414 may be emitted through top silicone layer 404 of the glass-based LEP 400 and through the bottom silicone layer 406 of the glass-based LEP 400. In some example embodiments, the bottom layer 406 includes the optic control pattern 502.

In some example embodiments, the lighting fixture 500 may include a gap 508 between the light sources 504 and the light receiving edge 414 of the glass layer 402 of the glass-based LEP 400. For example, the gap 508 may provide spacing to accommodate changes in the size of the glass-based LEP 400, for example, due to changes in temperature.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A glass-based light emitting panel (LEP), comprising:
   a glass layer having a first broad surface, a second broad surface, and a light receiving edge; and
   a first silicone layer; and
   a second silicone layer, wherein the first silicon layer is attached to the first broad surface of the glass layer, wherein the second silicone layer is attached to the second broad surface of the glass layer, and wherein the first silicone layer includes an optic control pattern, wherein the glass-based LEP is designed to receive light through the light receiving edge of the glass layer and to emit a first portion of the light through the first silicone layer and a second portion of the light through the second silicone layer.

2. The glass-based LEP of claim 1, wherein the optic control pattern of the first silicone layer is formed on a side of the silicone layer facing away from the glass layer.

3. The glass-based LEP of claim 1, further comprising an optically clear adhesive material between the first silicone layer and the glass layer.

4. The glass-based LEP of claim 1, wherein the second silicone layer includes a second optic control pattern.

5. The glass-based LEP of claim 1, wherein the first silicone layer is formed on the glass layer by pouring liquid silicone on the glass layer and curing the liquid silicone using ultraviolet light.

6. The glass-based LEP of claim 5, wherein the optic control pattern is formed by impressing a desired pattern into the first silicone layer.

7. The glass-based LEP of claim 1, wherein the first silicone layer is molded over the glass layer.

8. The glass-based LEP of claim 1, further comprising a protective glass sheet positioned over the first silicone layer to protect the glass-based LEP from dirt, dust, and water.

9. A light fixture, comprising:
a glass-based light emitting panel (LEP), comprising:
a glass layer comprising a broad surface and a light receiving edge, wherein the light receiving edge is narrower than the broad side; and
a silicone layer coupled to the broad surface of the glass layer, wherein the silicone layer includes an optic control pattern; and
a light source comprising a light emitting diode, the light source attached to a circuit board and positioned adjacent to the light receiving edge of the glass layer to emit light toward the light receiving edge of the glass layer, wherein the glass-based LEP is designed to emit at least a portion of the light through the silicone layer.

10. The light fixture of claim 9, wherein the optic control pattern of the silicone layer is formed on a side of the silicone layer facing away from the glass layer.

11. The light fixture of claim 9, wherein the silicone layer is attached to the broad surface.

12. The light fixture of claim 11, wherein the glass layer includes a second broad surface and wherein a second silicone layer is attached to the second broad surface.

\* \* \* \* \*